United States Patent [19]

Ishiguro et al.

[11] 4,240,508
[45] Dec. 23, 1980

[54] POWER-DRIVEN ROTARY GROUND WORKING IMPLEMENT

[75] Inventors: Toshio Ishiguro; Minoru Kyotani, both of Sakai, Japan

[73] Assignee: Kubota Ltd., Osaka, Japan

[21] Appl. No.: 23,133

[22] Filed: Mar. 22, 1979

[30] Foreign Application Priority Data

Mar. 23, 1978 [JP] Japan .............................. 53/38398[U]
Apr. 18, 1978 [JP] Japan .............................. 53/52246[U]
Apr. 18, 1978 [JP] Japan .............................. 53/52255[U]

[51] Int. Cl.³ ...................... A01B 33/02; A01B 33/12
[52] U.S. Cl. ........................................ 172/72; 172/80; 172/112
[58] Field of Search ..................... 172/112, 72, 63, 80, 172/678, 199, 449, 767, 118–123

[56] References Cited

U.S. PATENT DOCUMENTS

| 8,926 | 10/1879 | Dodge | 172/678 X |
|---|---|---|---|
| 1,289,023 | 12/1918 | Welsh | 172/80 |
| 2,214,702 | 9/1940 | Seaman | 172/112 X |
| 2,312,164 | 2/1943 | Holzbock | 172/112 |
| 3,009,520 | 11/1961 | Roland | 172/80 X |
| 3,684,029 | 8/1972 | Clover | 172/72 X |
| 4,128,129 | 12/1978 | Lely | 172/63 X |

FOREIGN PATENT DOCUMENTS 2515767 10/1975 Fed. Rep. of Germany .......... 172/112
262773 7/1964 Netherlands ............................. 172/678

Primary Examiner—Paul E. Shapiro
Attorney, Agent, or Firm—Armstrong, Nikaido, Marmelstein & Kubovcik

[57] ABSTRACT

A ground working implement comprises a frame, a rotary ground working unit supported by the frame and rotatable about a horizontal axis, a transmission for the working unit, a cover assembly covering the working unit and including a movable cover, and a holder detachably engageable with the frame and the cover to hold the cover while the cover is in contact with the ground at a position to the rear of and spaced from the peripheral portion of the working unit in contact with the ground. Thus the cover cooperates with the working unit to serve as a stand for holding the implement in its upright position. The cover is also holdable in a raised position by the holder to facilitate the maintenance of the working unit. The cover can also be shaped to have a front contact portion and a rear contact portion continuous therewith and positioned at a lower level than the front contact portion with an intermediate portion therebetween held out of contact with the ground by a space. A suspender can be provided for suspending the cover assembly from the frame, which can include a shock absorber.

7 Claims, 14 Drawing Figures

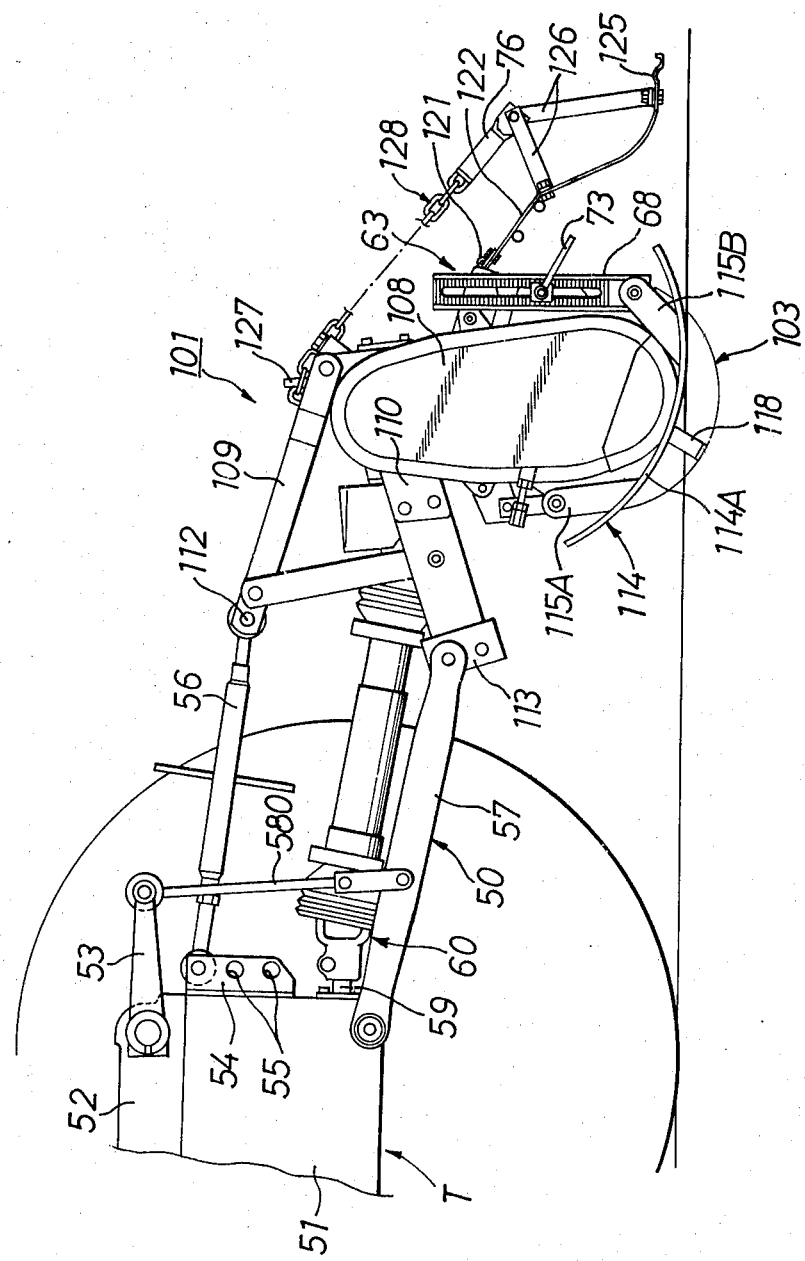

POWER-DRIVEN ROTARY GROUND WORKING IMPLEMENT

BACKGROUND OF THE INVENTION

The present invention relates to ground working implements, and more particularly to power-driven rotary ground working implements comprising a ground working unit which is driven about a horizontal axis to act on the soil.

Such ground working implements include power-driven cultivating implements which are attached to and drawn by tractors or like vehicles and which are widely used for tilling and breaking up the soil at the same time.

The cultivating implement is generally equipped with a gauge device to set the implement for a specified depth of working and also to support part of the implement. The gauge device comprises a pair of opposite gauge wheels which is usually disposed to the front or rear of the rotary tiller unit of the implement.

Gauge devices of the type stated above, although useful, involve a common problem because they are adapted, strictly speaking, for line contact with the ground; the wheels are liable to sink into the ground greatly and encounter great resistance against rolling, especially on a marshy or sandy field.

To overcome the above problem, a ground engageable stabilizer has been proposed and placed into use which comprises a pair of skids adapted to be positioned on opposite sides of the rotary tiller unit in place of the gauge wheels.

The ground contacting member of the known stabilizer is in the form of a circular arc and is curved upward toward the front and rear longitudinally thereof so as to be slidable on the field, so that when the working implement is detached from the connector, such as three-point link, on the power vehicle, the implement will fall forward or backward under gravity. The implement will then be very cumbersome to reconnect and require heavy labor and may possibly be damaged. Further if the hydraulic control unit incorporated in the tractor is operated for the position control of the rotary cultivating implement when the implement is used as attached to the tractor, the implement substantially need not be equipped with the gauge device or stabilizer, but even in such a case, the implement is still liable to fall down.

To eliminate this drawback, there is the need to provide a stand or some suitable support means for the implement, whereas such means renders the implement bulky, costly, and cumbersome and hazardous to handle because the stand or like support must be used with proper timing.

The rotary tiller unit, one of the power-driven rotary working implements, is usally provided with a cover assembly including a cover which serves to smooth and level the soil in contact therewith. However conventional cover assemblies leave a groove or furrow in the levelled surface of the soil and consequently renders the soil unfit for sowing. The cover assembly further includes a movable cover which is pivoted to the frame of the unit and suspended by a chain or the like, whereas the suspender or other members associated therewith are liable to deformation or damage when the cover is subjected to impact.

SUMMARY OF THE INVENTION

An object of this invention is to provide a working implement, such as a power-driven cultivating implement, which comprises a soil working unit rotatable about a horizontal axis and which further incorporates a cover assembly upwardly or downwardly movable relative to the frame of the implement and covering the rotatable working unit, the cover assembly being cooperative with the outer periphery of the working unit to serve as stand means for supporting the working implement in its upright position with stability, so that even when the working implement is provided with a ground contacting stabilizer beside the rotary working unit or is not equipped with any gauge wheel device or stabilizer, the working implement can be held stably in its upright position without resorting to the use of some additional stand member, the implement thus being made very convenient to maintain and connect to or disconnect from a tractor or like power vehicle.

Another object of this invention is to provide a cover assembly which is alternatively selectively retainable in a position in which it is in contact with the ground while covering the rotary ground working unit, or in an upwardly greatly opened position, by a holder detachably engageable with the frame of the implement and with the cover assembly, such that when the cover assembly is retained in its opened position, the assembly provides a large work space for facilitating proper maintenance of the rotary working unit, for example, for the replacement of tines or removal of soil or extraneous matter.

Another object of this invention is to provide a cover assembly which is adapted to contact the ground at a front and a rear portion, with the intermediate portion therebetween held out of contact with the ground by a space, the rear contact portion being positioned at a lower level than the front portion so that the soil cultivated by the working implement can be finished neatly with a smooth levelled surface having no streak.

Still another object of this invention is to provide a cover assembly including an upwardly or downwardly movable cover linked to the frame of the working implement by a suspender which incorporates a shock absorber, such that even when the cover is subjected to upward or downward shocks, the absorber lessens such shocks while also mitigating the external force to be exerted when the implement strikes a block of soil or the like during operation, whereby the cover and the suspender can be protected from damage or deformation.

BRIEF DESCRIPTION OF THE DRAWINGS

FIG. 9 is a side elevation showing the working implement as it is attached to a tractor;

DETAILED DESCRIPTION OF THE INVENTION

Figure 1:
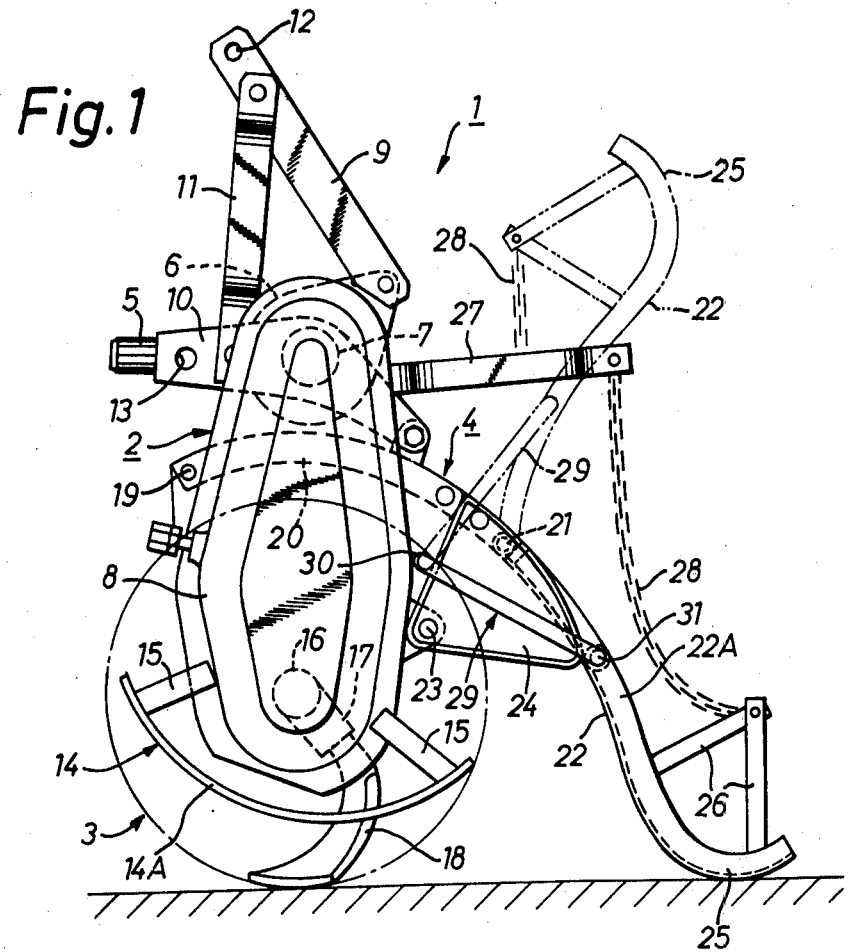
FIG. 1 is a side elevation showing a basic embodiment of this invention, namely a working implement, as detached from a tractor and held stably in its upright position.

FIG. 1 shows a power-driven rotary ground working implement 1, which is specifically a rotary tiller unit, as detached from a tractor and held in an upright position.

The working implement 1 comprises a ground working assembly 3 supported by a frame 2 at its lower portion and rotatable about a horizontal axis, and a cover assembly 4 covering the working assembly 3. In the illustrated embodiment, the working assembly is provided with transmission means of the side drive type.

The frame 2 includes a transmission case 6 having a power input shaft 5 disposed at a central upper portion thereof, a pair of arms 7 extending laterally outward from opposite sides of the transmission case 6, a side transmission case 8 fixed to and extending downward from the outer end of one of the arms 7, and a side plate (not shown in FIGS. 1 and 2) fixed to and extending downward from the outer end of the other arm 7. The transmission case 8 and the side plate are each provided with a bearing at a lower portion in opposed relation to each other.

The frame 2 further includes a top mast 9 supported by and extending upward from the transmission case 6, a connecting bracket 10 extending forward from a longitudinally intermediate portion of each arm 7, and a pair of opposite support links 11 each connecting the bracket 10 to the top mast 9. The top mast 9 has a top link connecting portion 12 which is a bore in the illustrated embodiment. The connecting bracket 10 has a lower link connecting portion 13 which is in the form of a bore in the illustrated embodiment.

A stabilizer 14 for contact with the ground is disposed on one side of the working assembly 3 and attached by a pair of front and rear supports 15 to the side transmission case 8 in the embodiment of FIG. 1. The ground contacting portion 14A of the stabilizer is in the form of a circular arc curved upward toward the front and rear and is made from a plate having a predetermined width. The stabilizer 14 is positioned radially inwardly of the working assembly 3.

The ground working assembly 3 comprises a rotary shaft 16 and rotary working members 18 attached as by bolts and nuts detachably to brackets 17 fixedly joined to the rotary shaft 16. In the illustrated embodiments, the working members are tines. Opposite ends of the rotary shaft 16 are supported by the bearings on the side transmission case 8 and on the side plate. The working assembly 3 may comprise a a screw, ridge forming screw, combination of screw tines, disc rotor, bascket-shaped rotor, or a rotary body for controlling weeds or for preparing a rice field for transplanting rice seedlings. Since the embodiment incorporates transmission means of the side drive type, the torque delivered to the input shaft 5 from the PTO shaft of a tractor (not shown) is transmitted through bevel gear means housed in the central transmission case 6 and chain means or gear means housed in the side transmission case 8 to the shaft 16 to drive the working assembly 3 about a horizontal axis.

The cover assembly 4 is secured to a support plate 8A for the side case 8 and to the side plate by fastening members such as bolts and nuts as indicated at 19. More specifically, the cover assembly 4 comprises a main cover 20 as secured as above, a movable cover 22 upwardly or downwardly movably pivoted to the main cover 20 by a plurality of bent members 21, and side covers 24 attached to the main cover 20 and to the side transmission case 8 by fastening members 23 such as bolts and nuts. The main cover 20 extends along the path of rotation of the working member 18 to cover the assembly 3. In the illustrated embodiment, the covering assembly prevents the soil from scattering and pulverizes and smooths the soil.

The movable cover 22 has a curved portion 25 for contact with the ground as seen in FIG. 1. The ground contacting portion 25 is provided with upstanding connected links 26 which are connected to a support bar 27 extending from the frame 2 by a suspender 28, which is a link chain in the illustrated embodiment.

Indicated at 29 is means for holding the cover assembly, particularly the movable cover 22. According to the preferred embodiment of this invention illustrated in FIG. 2, the means 29 is a channel-shaped holder including a main stem portion 29A and legs 29B bent toward each other at opposite ends of the portion 29A and parallel to each other. One of the legs 29B is detachably engageable with a bored engaging portion 30 formed in the support plate 8A for the case 8, while the other leg 29B is detachably engageable with an engaging portion 31 in the form of a pipe attached to a reinforcing rib 22A of the movable cover 22.

With the legs 29B engaged with the engaging portions 30 and 31, the holder 29 immovably holds the movable cover 22 relative to the frame 2 although the cover 22 is pivotable on the bent member 21. Accordingly when the movable cover 22 is fixedly held in place by the holder while the outer periphery of the working assembly or unit 3 (i.e. outer ends of some working members 18) and the ground contacting portion 25 of the movable cover 22 are in contact with the ground as spaced apart from each other, with the cover 22 positioned to the rear of the assembly 3 as seen in FIG. 1, the outer periphery of the assembly 3 and the ground contacting portion 25 coact to hold the working implement 1 in an upright position. For holding the implement in this position as illustrated in FIG. 1, it is of course assumed that the center of gravity of the implement 1 is positioned between the contact portion of the unit 3 with the ground and the contact portion 25.

Further when the working implement 1, coupled to the tractor as by three-point link means, is suspended in its raised position by the hydraulic lift means on the tractor with the movable cover 22 held by the holder 29 in the phantom-line position in FIG. 1, the working assembly 3 can be kept greatly opened at its rear portion. This is advantageous for the maintenance of the working unit 3.

FIGS. 3 to 11 show another useful embodiment of this invention. It is seen in FIG. 9 that a working implement 101 is attached to a tractor T by a threepoint link 50 and is thereby drawn.

The tractor T has a body 51 carrying thereon a hydraulic lifting unit 51 provided with a pair of opposite lift arms 53. The body 51 is further provided, at a rear upper portion thereof in the middle of width of the tractor T, with a top link mount 54 which is formed with three holes 55 in the illustrated embodiment. The holes 55 are aligned vertically as spaced apart.

The three-point link 50 includes a top link 56 which is extendable by screw means and has at opposite ends universal joints one of which is connected to the mount 54 by a pin passed through one of the holes 55. The other universal joint is attached by a pin to the connecting portion 112 of a top mast 109.

The three-point link 50 further includes a pair of opposite lower links 57 each provided at its opposite ends with universal joints. The joint of one end of each link 57 is pinned to a lower side portion of the body 51, while the joint on the other end thereof is connected by a pin to a connecting portion 113 of the working implement 101. The lower links 57 are connected, each at a longitudinally intermediate portion, to the lift arms 53 by lift rods 580.

Figure 3:
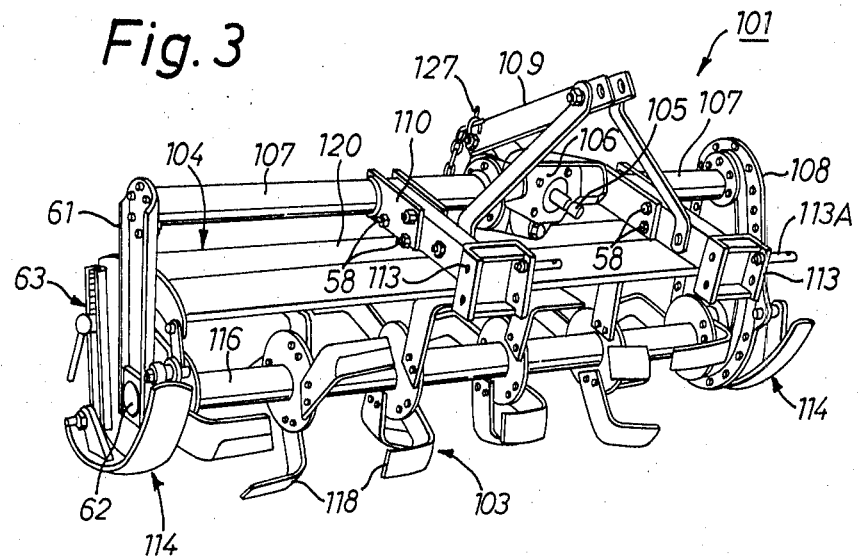
FIG. 3 is a perspective view showing another embodiment as it is seen from the front, in which the working implement is held stably in its upright position as disconnected from the tractor.
Figure 4:
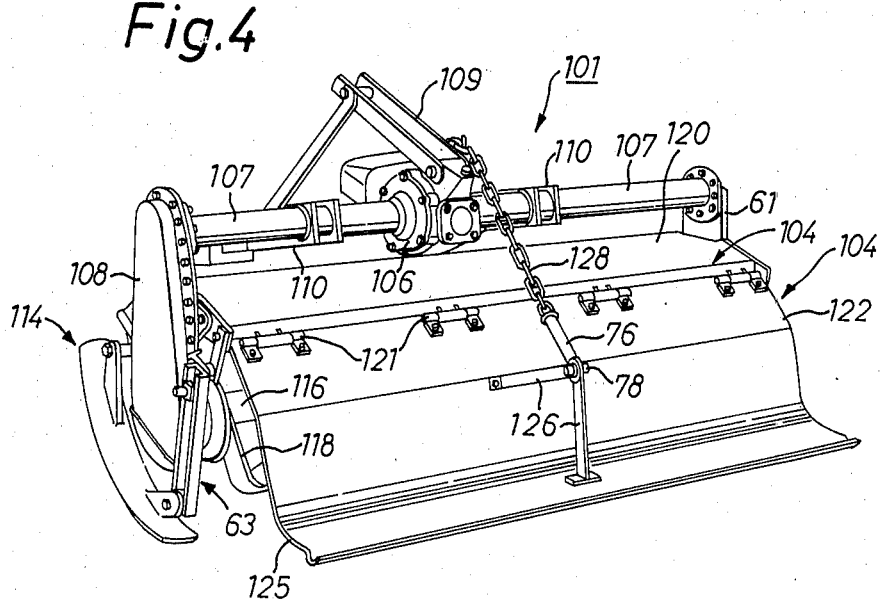
FIG. 4 is a rear perspective view showing the same.

As seen in FIGS. 3 and 4, a center transmission case 106 has a pair of opposite arms 107 each having a connecting bracket 110 extending forward from an axially intermediate portion of the arm 107. Each lower link connecting portion 113 is detachably fastened to the bracket 110 by bolts 58.

The connecting portion 113 shown in FIGS. 3 and 9 further comprises a pin 113A which is insertable selectively into one of two holes on either side of the portion 113.

The center transmission case 106 shown in FIGS. 3 and 4 houses bevel gear means and has a forwardly projecting power input shaft 105. The power from the PTO shaft 59 of the tractor can be delivered to the input shaft 105 by way of a transmission unit 60 as shown in FIG. 9.

As illustrated in FIGS. 3 and 4, a side transmission case 108 and a side plate 61 extend downward from the outer ends of the pair of arms 107 respectively. One of the arms 107 houses a shaft (not shown) for coupling the transmission means in the case 106 to like means in the side case 108.

FIG. 3 shows a rotary working assembly 103 comprising a rotary shaft 116 and ground working members 118. The rotary shaft 116 is supported at opposite ends by bearings 62.

A stabilizer 114 adapted for contact with the ground is disposed on each side of the working unit 103 according to the embodiment shown in FIGS. 3 to 5 and 9. Stated more specifically the stabilizer 114 is provided at a lower portion of each of the side transmission case 108 and the side frame 61 and is equipped with level adjusting means 63. As een in FIGS. 5 and 9, a front bracket 64 and a rear bracket 65 are disposed at an intermediate portion of each of the case 108 and side frame 61 with respect to the height thereof. The front bracket 64 is connected for reinforcement to a fixed cover 120 by a stay 66. The stabilizer 114 comprises a stabilizer member 114A having a front support 115A pivotably connected by a fastening member 67 to the front bracket 64 and a rear support 115B pivotably connected by a fastening member 69 to the lower end of a level adjusting member 68.

Figure 5:
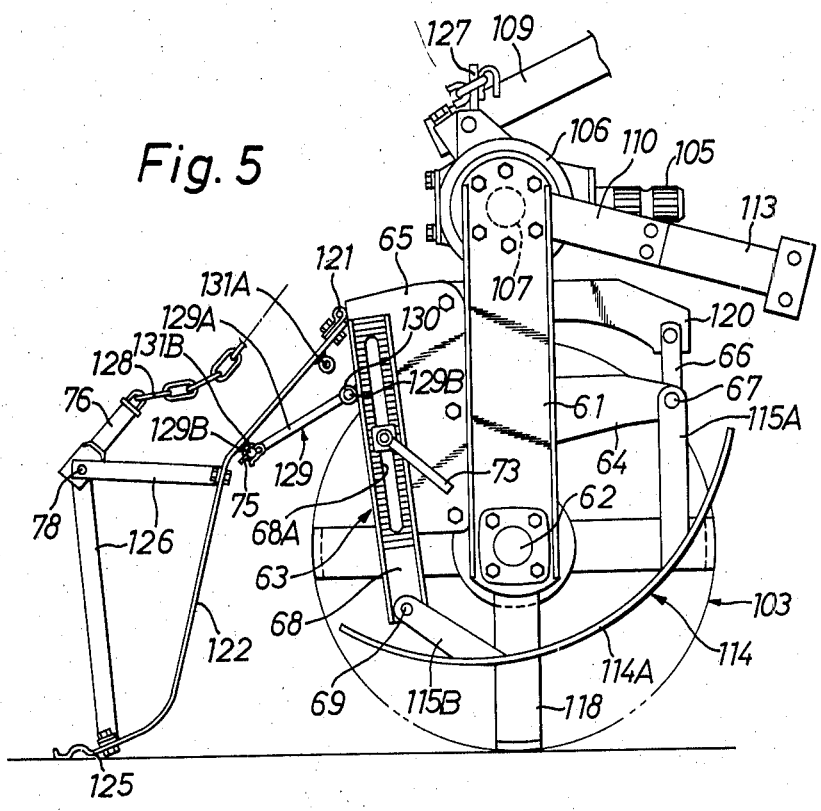
FIG. 5 is a side elevation showing a holder for the movable cover included in the embodiment of FIG. 3.
Figure 6:
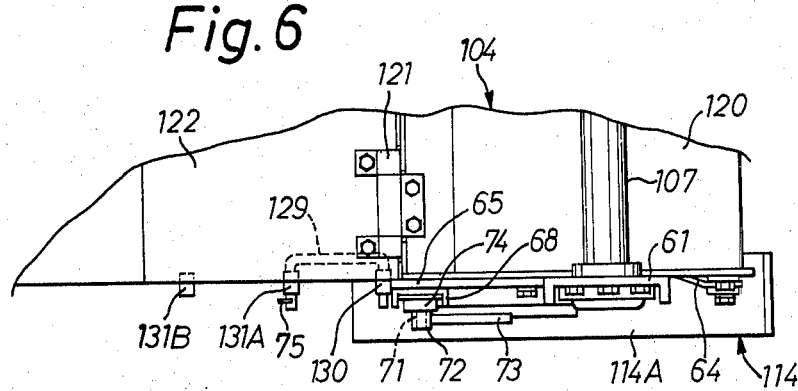
FIG. 6 is a fragmentary plan view of FIG. 5.

To describe in greater detail with reference to FIG. 5, the level adjusting member 68 has a slot 68A extending longitudinally thereof and a rough engaging portion 70 extending along the slot. On the other hand, the rear bracket 65 is fixedly provided with a threaded pin 71 extending through the slot 68A and having a nut 72 screwed thereon. The nut 72 is integral with a handle 73. A member 74 loosely mounted on the threaded pin 71 is engageable with or disengageable from the engaging portion 70 by the nut 72 when the handle is tightened up or reversely turned.

Accordingly the stabilizer members 114A of the pair of opposite stabilizers 114 positioned radially inwardly of the working assembly 103 are positionable to an adjusted level by the level adjusting means 63, the stabilizer member shown in FIGS. 5 and 9 being movable about the fastening member 67.

A cover assembly 104 comprises a main cover 120 secured to the frame of the implement 102 and a movable cover 122 connected to the cover 120 by bent members 121 shown in FIG. 4. Means for holding the movable cover 122 is provided on the same side as the side plate 61 in the embodment of FIGS. 3 to 11.

With reference to FIGS. 5 to 8, a holder 129 includes a main stem portion 129A and legs 129B bent in parallel to each other. The rear bracket 65 is provided at an upper portion thereof with an engaging portion 130 in the form of a pipe, while the movable cover 122 is formed on its rear side with a pair of engaging portions 131A and 131B each similarly in the form of a pipe.

The holder 129 is detachably engageable with the engaging portions 130, 131A and 131B. When the legs 129B are engaged with the engaging portion 131B on the cover and the engaging portion 130 on the frame, the cover 122 rests on the ground at a portion 125 with a outer peripheral portion (i.e. the outer ends of some working members 118) of the assembly 103 also in contact with the ground, with the result that the contact portion 125 and the assembly 103 hold the implement in its upright position with stability, with the pair of stabilizers 114 positioned above the ground, even when the implement 101 is disconnected from the three-point link 50. Thus the flexible movable cover 122 is held by the holder 129 to the frame 102 to provide a stand for the implement in cooperation with the working assembly 103 (working members 118).

Figure 7:
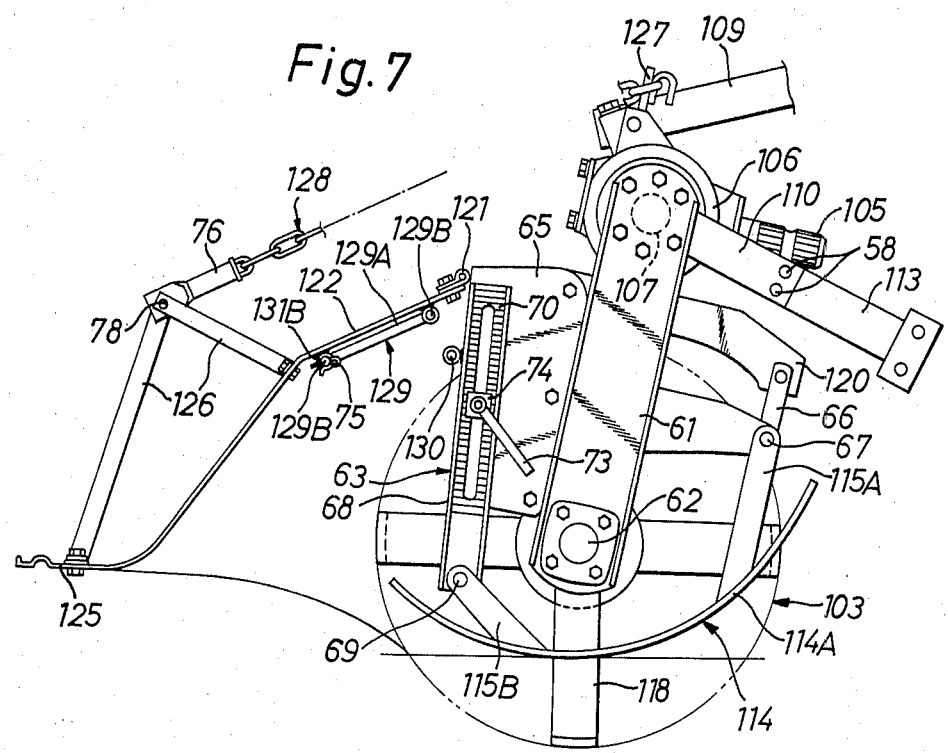
FIG. 7 is a side elevation showing the movable cover as it is held in position during cultivation.

Further when the holder 129 is engagement with the front and rear engaging portions 131A and 131B on the movable cover 122 as seen in FIG. 7, the movable cover 122 which is free to pivotally move relative to the main cover 120 hangs down under gravity. The embodiment of FIG. 9 is illustrated while in operation with the cover 122 thus positioned. The movable cover 122 is restrained from hanging down by the suspender 128.

Figure 8:
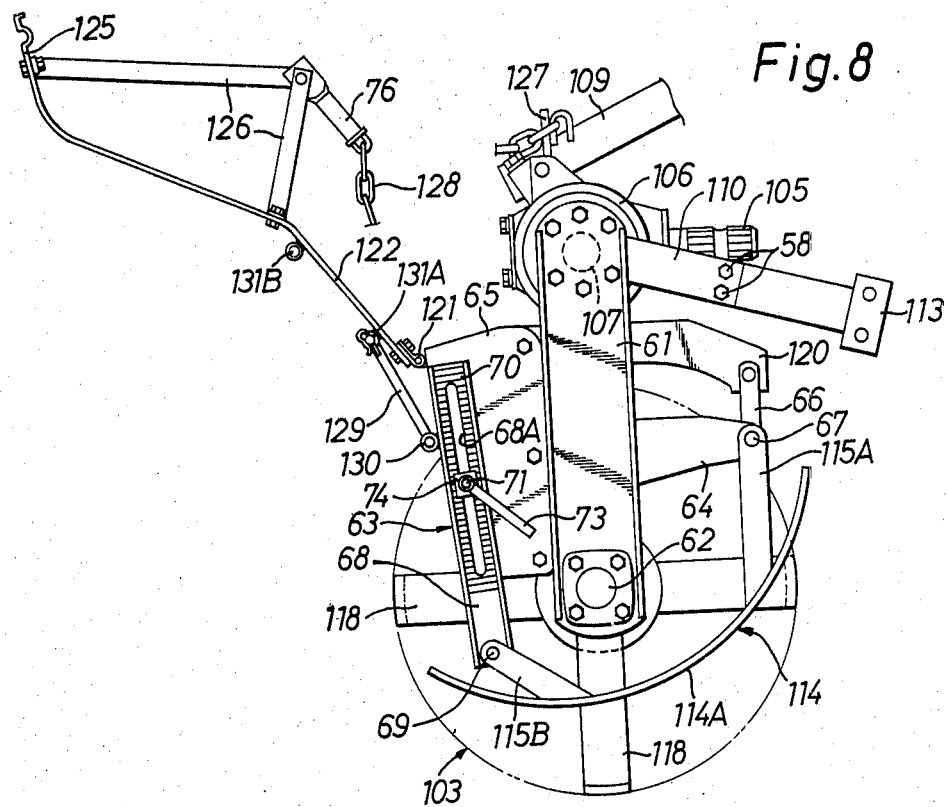
FIG. 8 is a side elevation showing the movable cover as it is held in place, for example, for the maintenance of a ground working unit.

Further if the holder 129 is engaged with the front engaging portion 131A on the movable cover 122 and the engaging portion 130 on the frame 102 as shown in FIG. 8, the movable cover 122 is held in a position in which it extends rearwardly upward as supported by the bent members 121, thus exposing the working assembly 103 at its rear portion. If the implement 101 thus positioned as seen in FIG. 8 is raised, the working assembly can be handled conveniently for the replacement of working members and maintenance.

Indicated at 75 in FIGS. 5 to 8 is a retainer for the holder 129. When the holder 129 is engaged with two of the engaging portions 130, 131A and 131B, the retainer 75 is inserted into a bore diametrically extending through the leg 129B to prevent the holder from slipping off.

Figure 2:
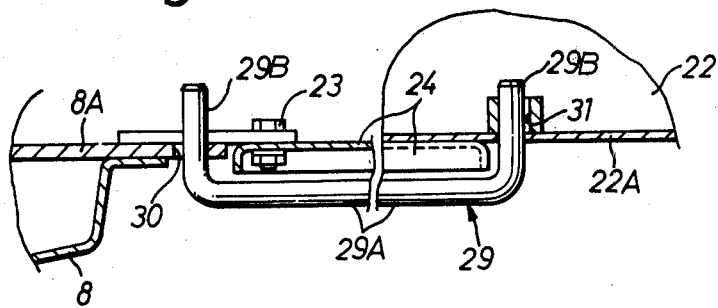
FIG. 2 is a fragmentary plan view in section showing a cover assembly as engaged with the implement by a holder.

Although the holder 129 is detachably engaged with the engaging portions 130, 131A and 131B from inside as seen in FIGS. 5 to 8, the holder 129 may be made engageable from outside as seen in FIG. 2.

While the implement is in operation in the state of FIG. 9, blocks of tilled soil are forced against the cover assembly 104 by the working assembly 103 and broken up, possibly deforming the movable cover 122 or bent members 121 or causing damage to the suspender owing to the resulting impact. When the reactor travels with the implement held in its raised position, attendant shakes or shocks will tension the suspender 128.

Figure 10:
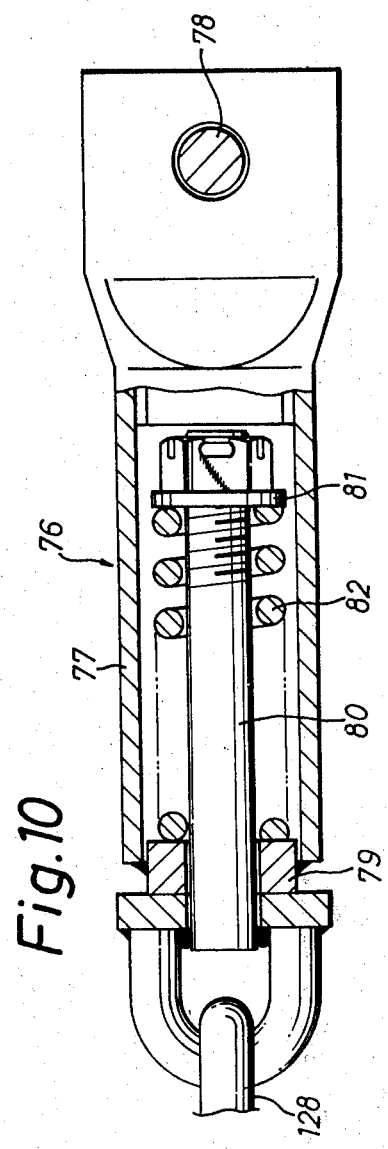
FIG. 10 is an enlarged view in section showing part of the suspender illustrated in FIG. 9.

In order to eliminate the possible objections, the suspender 128 incorporates a shock absorber 76 including a spring as seen in FIG. 4 and 9 to 10.

With reference to FIGS. 9 and 10, links 126 connected together and upstanding on the movable cover 122 are connected by a pin 78 to a tubular member 77. A rod 80 is slidably passed through a spring seat 79 joined to the tubular member 77. The rod 80 carries a coil spring 82 acting between the spring seat 79 and another spring seat 81 screwed on the rod 80. The rod is connected to a ring of the suspender 128.

As shown in FIGS. 3, 4 and 9, the suspender 128 is detachably engaged, at a suitable portion thereof, with a pin 127 fixed to the base of the top mast 109. The angle between the cover 122 and the ground is therefore properly adjustable.

Every time impact acts on the cover assembly 104, the cover 122 moves up or down about the bent members 121 under the impact, and when the cover 122 moves down, abnormal tension momentarily acts on the suspender 128. In such an event, the spring 82 is compressed to mitigate the shock to protect the parts concerned from damage or deformation or prevent bolts from loosening.

The shock absorber 76 of course acts effectively against shakes or shocks when the tractor travels with the implement suspended in its raised position. The shock absorber 76, which is disposed at the lower end of the suspender 128 in the illustrated embodiment, may be provided at the upper end or an intermediate portion of the suspender 128. Two absorbers may be provided at the upper and lower ends.

When the working implement cultivates the soil in the state of FIG. 9, the ground contacting portion 125 of the cover 122 acts to smooth and level the tilled soil. A stay 126A is attached to the contacting portion 125 by a fastening member 83 and is detachably fastened to the link 126 by a member 83A. The fastening member includng a nut, washer and the like for the stay 126A forms a projection opposed to the ground, with the result that the fastening member 83 forms a streak on the levelled surface of the soil. This is not desirable for sowing.

This drawback can be overcome if the link 126 is welded to the cover 122, but deformation will then result from welding. Additionally it is most disadvantageous that when the link 126 is broken, the cover assembly 104 must then be wholly replaced.

Figure 11:
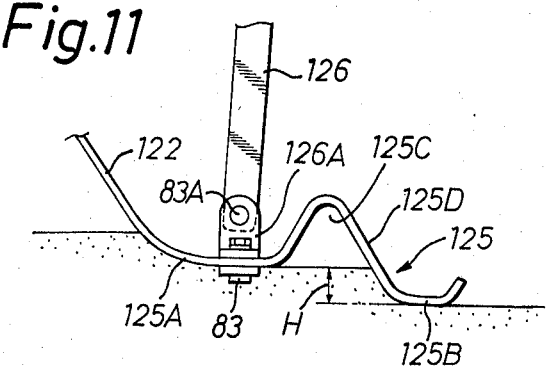
FIG. 11 is a side elevation showing in greater detail a ground contacting assembly on the movable cover shown in FIG. 9.

The ground contacting portion 125 shown in FIG. 11 is useful. The portion 125 comprises a front contacting portion 125A and a rear contacting portion 125B extending in parallel to each other over the entire width of the cover 122, and an intermediate portion continuous with the portions 125A, 125B and similary extending over the entire width, the intermediate portion being held out of contact with the ground by a space 125C. The rear portion 125B is positioned at a lower level than the front portion 125A as indicated at H. Accordingly the soil smoothed by the front contacting portion 125A is subsequently further smoothed by the rear contacting portion 125B during cultivation so that the soil can be finished neatly with a smooth surface despite the provision of the link 126. Moreover when the soil is smoothed second time, the projecting portion 125D defining the space 125C encounters resistance and is subjected, for example, to bending torsion centered about an axis in the direction of travel of the implement, with the result that the rear portion 125B acts to form a horizontal smooth surface over the entire width at all times. The space 125C serves to hold part of excess soil therein and release the soil sidewise or replenishes a location where sufficient soil is not available for levelling.

It is seen in FIG. 9 that the working implement is attached to and drawn by the tractor T by means of the three-point link 50. The working assembly 103 is driven by the transmission unit 60. During operation, the working unit 103 may be subjected to an excess of impact which will exert an objectionable external force on the transmission unit incorporated in the body 51.

Figure 14:
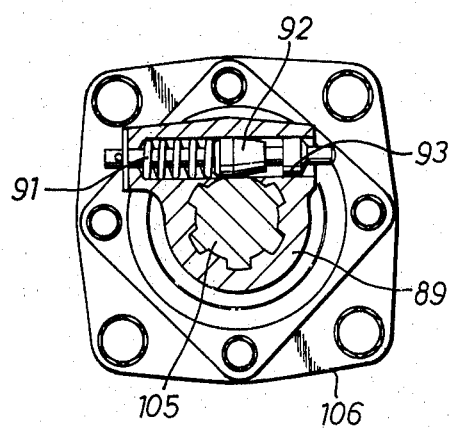
FIG. 14 is a view in section taken along the line 14—14 in FIG. 12.
Figure 13:
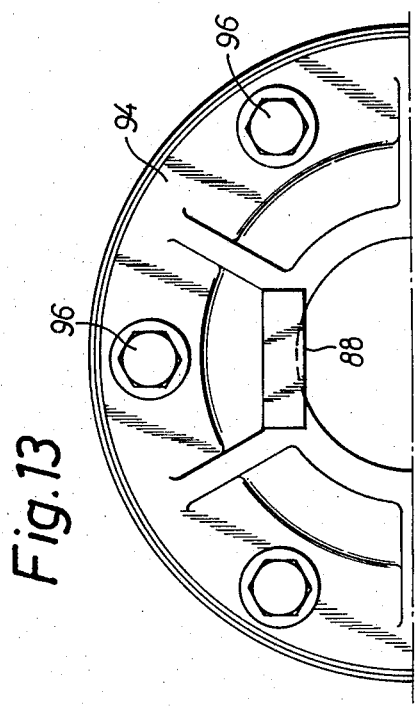
FIG. 13 is a front view showing one half of the system of FIG. 12 as it is seen in the direction of an arrow 13 in FIG. 12.
Figure 12:
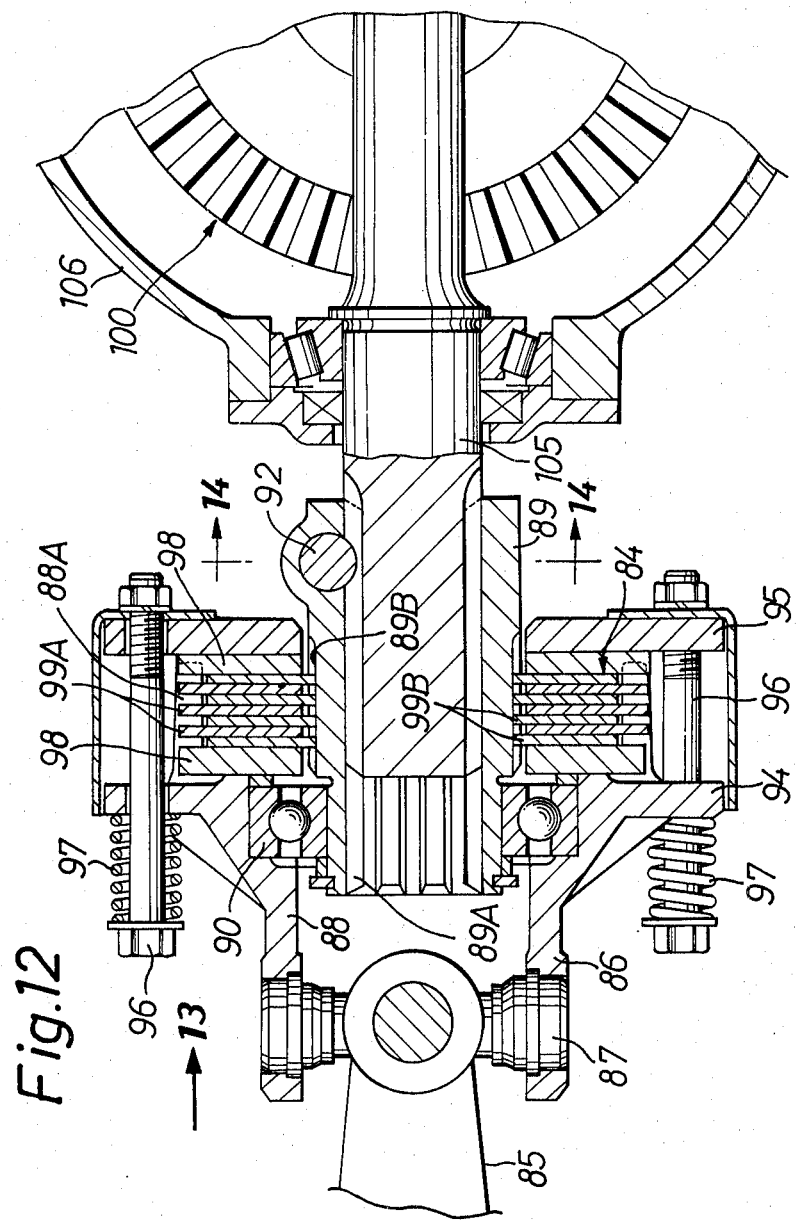
FIG. 12 is a fragmentary side elevation in section showing an exemplary power transmission system for the working implement.

To eliminate such situation, the universal joint portion of the transmission unit 60 incorporates a sliding clutch 84 as seen in FIGS. 12 to 14.

The transmission unit 60 has at its opposite ends joints comprising a cross joint or trunnion and connected to the tractor PTO shaft 59 and the power input shaft 105 respectively, while FIG. 12 shows a clutch incorporated in the joint for the input shaft 105. The clutch 84 may of course be incorporated in the joint for the tractor PTO shaft.

With reference to FIG. 12, a stub 85 and a yoke 86 are connected together by a trunnion or cross connector pin 87. The yoke 86, incorporating the sliding clutch 84 of the disk type, is divided into a body 88 and a sleeve 89. The body 88 and the sleeve 89 are made rotatable relative to each other by a ball bearing 90. The sleeve 89 is splined in its inner and outer surfaces as indicated at 89A and 89B.

The sleeve 89 is fitted over the input shaft 105 with its inner splined portion 89A in engagement with a splined portion of the input shaft 105. The sleeve 89 is formed with a pin bore 93 for receiving a tapered retainer pin 92 biased by a spring 91 (see FIG. 4).

The clutch 84 includes a body flange 94 and a pressure ring plate 95 opposed thereto and connected to the flange by bolts 96 whose axial length is adjustable and which are circumferentially spaced apart at equal spacing. The bolts 96 are each provided with a coil spring 97 for biasing the ring plate 95 toward the clutch engaging direction.

Drive disks 99A and driven disks 99B alternately arranged side by side are provded between a pair of distance ring plates 98. The drive disks 99A are held by an engaging portion 88A of the body 88 against movement circumferentially thereof, while the driven disks 99B are held in engagement with the outer splined portion of the sleeve 89 against circumferential movement.

FIG. 12 futher shows a bevel gear 100 housed in the transmission case 106.

With the transmission unit 60 illustrated in FIG. 12, the torque from the tractor PTO shaft shown in FIG. 9 is delivered to the input shaft 105 or to the input shaft 5 shown in FIG. 1 to drive the working assembly 103 or 3.

When the working unit is subjected to abnormal impact, the clutch 84 slides, thus protecting the transmission unit including the PTO shaft. The clutch 84 is adjustable for disengagement and engagement for torque transmission by varying the amount of the advance of the nut 96A relative to the bolt 96 to control the action of the spring 97.

The transmission unit 60 is removable from the tractor PTO shaft 51 and the power input shaft 105 or 5 when the retainer pin 92 is withdrawn and the sleeve 89 also withdrawn as will be apparent from FIG. 12 which shows the shaft 105 as an example.

A sliding clutch is incorporated into a transmission unit usually as assembled with the power input shaft, but in this case there arises the need to disassemble the cross pin for the maintenance of the clutch, whereas with the arrangement shown in FIG. 12 in which the sleeve 89 is divided from the body 88, the cross pin 87 need not be separated for the maintenance of the clutch.

The features of this invention will be stated briefly below. Suppose it is desired to remove the power-driven rotary ground working implement 1 or 101 from the tractor to which it is attached by a three-point link and also to remove the transmission unit 60 so that the implement will be held in its upright position. With the embodiment shown in FIGS. 1 and 2 and as connected to the three-point link, the working members 18 on the assembly 3 and the ground contacting portion 25 of the movable cover 22 are placed into contact with the ground with the latter positioned to the rear of and spaced from the former while positioning the center of gravity of the working implement 1 between the two contact portions. The holding means, namely the holder 29 according to the preferred embodiment, is then engaged at its legs 29B with the engaging portion 30 on the frame 2 and with the engaging portion 31 on the cover 22 to fixedly hold the movable cover 22. The three-point link is thereafter removed. Consequently the cover 22 and the working assembly, namely working members 18, coact to provide a stand to stably hold the working implement 1 in its upright position. The working implement 1 can be thus positioned upright stably even when it is provided with the ground contacting stabilizer beside the working assembly 3 or is not equipped with any gauge wheel device or stabilizer. The structure of this invention is therefore very useful for preventing the implement from falling for protection against damage and also for reconnecting the implement to the tractor.

With the embodiment shown in FIGS. 3 to 11 and as connected to the three-point link 50, working members 118 on the assembly 103 and the ground contacting portions 125 of the movable cover 122 are placed into contact with the ground with the latter positioned to the rear of and spaced from the former while positioning the center of gravity of the working implement 101 between the two contact portions. The legs 129B of the holder 129 are then engaged with the engaging portions 130 on the frame 102 and with the engaging portion 131B on the cover 122 to fixedly hold the movable cover 122. As a result, the cover 122 and the working members 118 cooperate to provide a stand to stably hold the implement 101 in its upright position even when the three-point link 50 is disconnected from the implement. Further according to the preferred embodiment shown in FIGS. 5 to 8, the holder 129 can be held attached to the cover 122 as engaged with the engaging portions 131A and 131B during operation. This is desirable since the holder 129 will not get lost.

Although the rotary working unit of the ground working implement is adapted to be driven by transmission means of the side drive type according to the embodiments described above, this invention is also useful for those of the center drive type without departing from the scope of the invention as defined in the appended claims.

What is claimed is:

1. A power-driven rotary ground working implement comprising a frame, a rotary ground working unit supported by the frame and rotatable about a horizontal axis, transmission means provided for the working unit, a cover assembly covering the working unit, and a ground contacting stabilizer of the skid type supported by the frame on at least one side of the working unit and positioned radially inwardly from the outer periphery of the working unit, the working implement including stand means for supporting the working implement with stability as disconnected from a power vehicle, the stand means being characterized in that:

the cover assembly 4,104 comprises a main cover 20, 120 fixed to the frame 2, 102 and a movable cover 22, 121 upwardly or downwardly connected to a rear portion of the main cover 20, 120 by bent members 21, 121, the movable cover 22, 122 being supported by a frame 27, 127 with a suspender 28, 128;

the outer periphery of the working unit 3 and a rear portion 25, 125 of the movable cover 22, 122 are in contact with the ground at the front and rear locations spaced apart from each other on opposite sides of the bent members 21, 121 on the movable cover 22, 122, the center of gravity of the working implement 1, 101 being positioned between the front and rear contacting portions;

the outer periphery of the working unit 3 and the rear portion 25, 125 of the movable cover 22, 122 are made cooperative to serve as the stand means by holding means 29, 129 provided for the movable cover 22, 122 on at least one side of the working unit; and the holding means 29, 129 comprises a first engaging portion 30, 130 provided on the frame 2, 102 below the bent member 21, 121 on the movable cover 22, 122, at least one second engaging portion 31, 131A, 131B at a longitudinally intermediate side portion of the movable cover 22, 122 and an engaging member 29A, 129A removably engageable with the first engaging portion 30 130 and with the second engaging portion 131A, 131B, so that the engaging member 29A, 129A restrains the movable cover 22, 122 from moving about the bent member 21, 121 relative to the frame 2, 102 when the rear portion 25, 125 of the cover 22, 122 is in contact with the ground and when the working implement 1, 101 is lifted in its entirety with the rear portion 25, 125 raised to open the working unit 3 to the rear.

2. A working implement as defined in claim 1 wherein the first engaging portion 30, 130 on the frame 2, 102 and the second engaging portion 31, 121A, 131B on the movable cover 22, 122 are each in the form of a pipe member, and the engaging member 29A, 129A has at its opposite ends engaged portion 29B, 129B projecting in the same direction in parallel.

3. A working implement as defined in claim 1 wherein the second engaging portions 131A, 131B on the movable cover 122 are two pipe members fixed to the inner surface of the cover 122, and the distance between the second engaging portions 131A, 131B is equal to the distance between engaged portions 129B projecting from both ends of the engaging member 129A in the same direction in parallel, the engaging member 129A being attachable to the inner surface of the movable cover 122 for accommodation.

4. A working implement as defined in claim 1 wherein the ground contacting stabilizer of the skid type 114 comprises a skid 114A having a curved surface and pivotalby supported at a front portion by a pivot 67 on the frame, and a level adjusting means 63 provided between a rear portion of the skid and the frame for positioning the skid 114A at an adjustable level.

5. A working implement as defined in claim 4 wherein the ground contacting stabilizer of the skid type 114 is provided on each side of the working unit, and the level adjusting means 63 for adjusting the level of the skid 114A about the front portion pivot 67 comprises an adjusting member 68 extending in the direction of the height of the frame, having engaging portions arranged in the direction of the height at specified spacing and having a slot 68A, a threaded pin 71 fixed to the frame and extending through the slot 68A, a threaded member 72 screwed on the threaded pin 71 and having a handle 73, and an engaging member 74 loosely mounted on the pin 71 and engageable with or disengageable from the engaging portion 70 by the threaded member 72.

6. A working implement as defined in claim 1 wherein the suspender 28, 128 is provided at its base portion with a shock absorber 76 comprising a tubular member 77, a rod 80 slidably inserted in the tubular member 77 and a coil spring 82 wound on the rod 80 within the tubular member 77 to support the movable cover 22 with the spring 82 in a compressed state.

7. A working implement as defined in claim 1 wherein the ground contacting portion 25, 125 of the movable cover 22, 122 comprises a front contacting portion 125A and a rear contacting portion 125B positioned at a lower level than the front portion 125A, the two contacting portions 125A and 125B being continuous with a space 125C provided therebetween to partially hold the portion 25, 125 out of contact with the ground.

* * * * *